United States Patent [19]

Tsunemine

[11] Patent Number: 5,956,080
[45] Date of Patent: Sep. 21, 1999

[54] PRINTING FACE INSPECTING APPARATUS

[75] Inventor: Toyohiko Tsunemine, Hyogo-ken, Japan

[73] Assignee: Sanyo Electric Co., Ltd., Moriguchi, Japan

[21] Appl. No.: 08/844,958

[22] Filed: Apr. 23, 1997

[30] Foreign Application Priority Data

| Apr. 25, 1996 | [JP] | Japan | 8-105174 |
| Jun. 5, 1996 | [JP] | Japan | 8-143013 |

[51] Int. Cl.⁶ .................................................. H04N 7/18
[52] U.S. Cl. .......................... 348/93; 382/101; 356/237
[58] Field of Search ..................................... 356/237, 239, 356/429, 430; 382/101, 8, 162, 318, 143, 56, 1; 348/125, 91, 169; 235/462, 440; G06F 15/62

[56] References Cited

U.S. PATENT DOCUMENTS

| 4,561,103 | 12/1985 | Horiguchi et al. | 382/1 |
| 4,783,825 | 11/1988 | Hirose et al. | 382/101 |
| 4,783,826 | 11/1988 | Koso | 382/8 |
| 5,103,489 | 4/1992 | Miette | 382/101 |
| 5,267,335 | 11/1993 | Mita | 382/318 |
| 5,293,431 | 3/1994 | Hayduchok et al. | 382/101 |
| 5,311,999 | 5/1994 | Malow et al. | 348/91 |
| 5,384,643 | 1/1995 | Inga et al. | 382/56 |
| 5,504,319 | 4/1996 | Li et al. | 382/318 |
| 5,600,732 | 2/1997 | Ott et al. | 382/318 |
| 5,625,715 | 4/1997 | Trew et al. | 348/169 |
| 5,675,671 | 10/1997 | Hayduchok et al. | 382/101 |
| 5,714,998 | 2/1998 | Wheeler | 356/237 |

FOREIGN PATENT DOCUMENTS

| 4-143639 | 5/1992 | Japan . |
| 5-94517 | 4/1993 | Japan . |

OTHER PUBLICATIONS

The IBM Bulletin, M.A.R.S., IBM Automatic Mail Recognition System, Mar. 1995.

*Primary Examiner*—Tommy P. Chin
*Assistant Examiner*—Luanne P. Din
*Attorney, Agent, or Firm*—Armstrong, Westerman, Hattori, McLeland and Naughton

[57] ABSTRACT

A printing face inspecting apparatus comprising an illuminating device for illuminating a printing face of an object to be inspected and a plurality of image pickup devices for taking pictures of reflection light from the printing face. The image pickup devices consist of a color camera arranged in approximate a center of the devices, and a plurality of black and white cameras arranged on the outer periphery of the color camera. Both of hue defects and the concentration difference defects can be inspected, and all the defects on the printing face can be detected without fail. The deterioration through detection leakage of the defects can be reduced and the quality of the objects to be inspected can be improved.

5 Claims, 9 Drawing Sheets

PRINTING FACE INSPECTING APPARATUS

BACKGROUND OF THE INVENTION

The present invention relates to an inspecting apparatus for inspecting the printing face condition of letters, graphics, and the like, printed on the surface of the object to be inspected, such as a compact disk (hereinafter referred to as CD), or the like.

Generally, in order to display recording contents on the CD, maker name, music name, player name, and so on, are printed on the surface of the CD. As an inspecting apparatus for inspecting as to whether or not the printing condition is defective, Japanese Unexamined Patent Publication No. 94517/1993 discloses "Image Inputting Apparatus for Optical Inspecting Apparatus", wherein the defects of the printing face are detected with the use of a plurality of moving picture apparatuses (two CCD cameras). Also, in the description of the publication, four CCD cameras are used to take pictures with one CD being divided into four portions for higher resolution and speed. In the publication, whether the camera is for color use or for black and white use is not described. The construction wherein four color CCD cameras are used is not realistic in terms of cost, or the like. So, it is considered that the construction is composed of four black and white cameras.

Conventionally, there is a method of taking pictures with the use of one color camera as a moving picture apparatus in the printing face inspecting apparatus, or with the use of four back and white cameras, as described in the conventional example, with one CD being divided into four portions. However, the method has the following problems.

In the former wherein one color camera is employed, the resolution is so low that the micro defects cannot be detected. Increase of the number of the color cameras (to four, for example) for improving the resolution would make image pickup apparatus expensive. In the color camera, the price of the image processing apparatus positioned in the rear stage of the image pickup apparatus becomes higher as compared with the black and white camera. The image processing apparatus becomes higher in price in accordance with the number of the cameras. The advantage of the color camera is three times in information amount (the color information of R, G, B) as compared with the black and white camera, thus making it possible to effect a color judging operation.

In the latter, the price per camera and per image processing apparatus is lower as compared with that of the color camera. The higher resolution for image pickup operation using four black and white cameras can detect micro defects. Although the black and white camera can tell the density of the color, the color cannot be judged because color information is lacking.

As described above, both the former and the latter have advantages and disadvantages, respectively. The present invention is provided to settle the defects of the conventional image pickup apparatus. The present invention realizes a printing face inspecting apparatus having a low-priced image pickup apparatus, wherein the micro defects on the printing face can be detected with the black and white camera, and the color judgment can be effected with the color camera

SUMMARY OF THE INVENTION

In accordance with the present invention, there is provided a printing face inspecting apparatus comprising an illuminating device for illuminating a printing face of an object to be inspected and a plurality of image pickup devices for taking pictures of reflection light from the printing face wherein the image pickup devices comprise an array of cameras including a color camera arranged approximately in a center of the devices, and a plurality of black and white cameras arranged about the outer periphery of the color camera.

Furthermore, in the image pickup devices, the optical axes of a plurality of black and white cameras can be arranged radially and outwardly at equal distances from an optical axis of the color camera, with the optical axis of the color camera being as a center.

Moreover, in the image pickup devices, the optical axes of a plurality of black and white cameras can be arranged radially and outwardly at equal distances from an optical axis of the color camera and at equal angles, with the optical axis of the color camera being as a center.

In the present invention, the cameras may be fixed in such a manner that a fixing means for fixing the cameras to a main body of the printing face inspecting apparatus is rotatable around an optical axis of the color camera and the printing image of the object to be inspected is aligned with the image reference of the camera.

The image pickup device may further include a fixing means for fixing the cameras to a main body, the fixing means being designed to rotate the black and white cameras around an optical axis of the color camera in accordance with the printing picture on the printing face.

Further, the fixing means might be designed to rotate the black and white cameras around an optical axis of the color camera in accordance with a printing direction on the printing face.

DETAILED DESCRIPTION

The printing face inspecting apparatus of the present invention comprises an illuminating device for illuminating the printing face of a mirrorlike object to be inspected, such as a CD, an image pickup device for taking pictures of reflection light from the printing face, and an image processing device for analyzing the image photographed by the image pickup device.

In the image pickup device, one color camera is arranged in the approximate center thereof, and four black and white cameras are arranged on the outer periphery of the color camera.

In the image pickup device, four black and white cameras are arranged on the outer periphery around the optical axis of the color camera with the optical axis of the color camera being aligned with the approximate center of the printing face of the mirrorlike object to be inspected and with the optical axes of the four black and white cameras being parallel with the optical axis of the color camera. The black and white cameras are arranged such that the respective optical axes of the four black and white cameras may be at an equal distance externally from the intersection point of two diagonal lines intersecting each other at a right angle where the optical axis of the color camera is an intersecting point.

Figure 1:
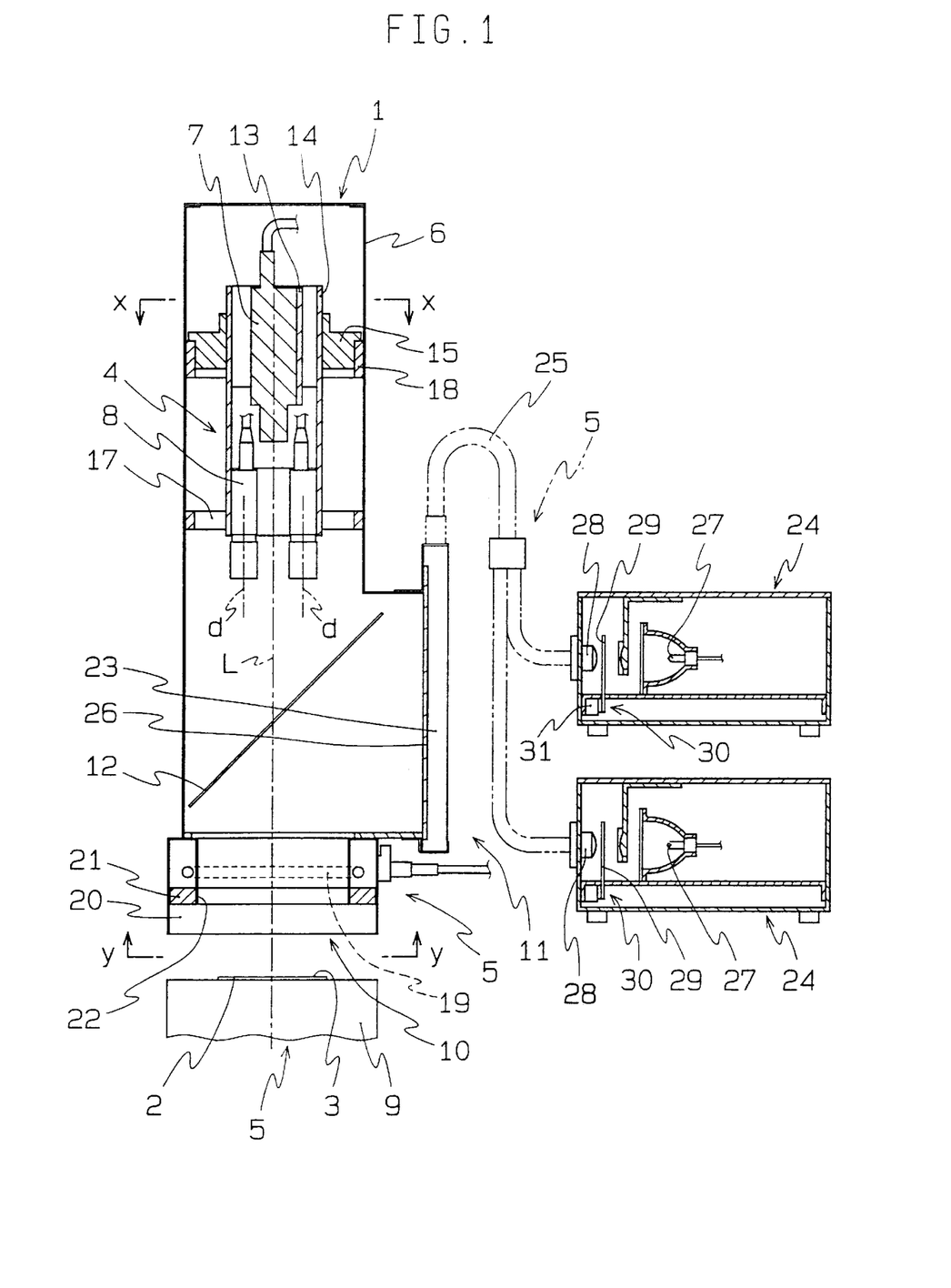
FIG. 1 is a schematic sectional view showing a major construction of an embodiment of a CD printing face inspecting apparatus of the present invention.
Figure 2:
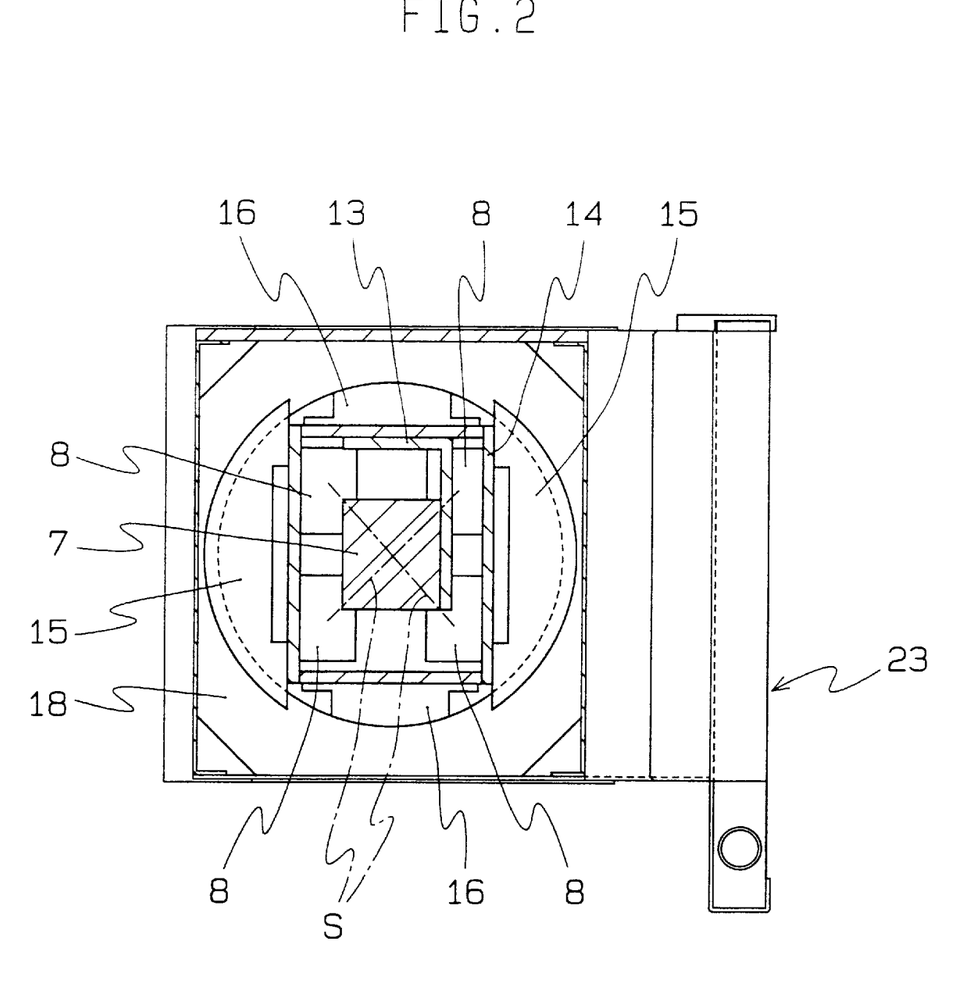
FIG. 2 is a sectional view taken along the line 2—2 of an image pickup device of the embodiment of FIG. 1.
Figure 3:
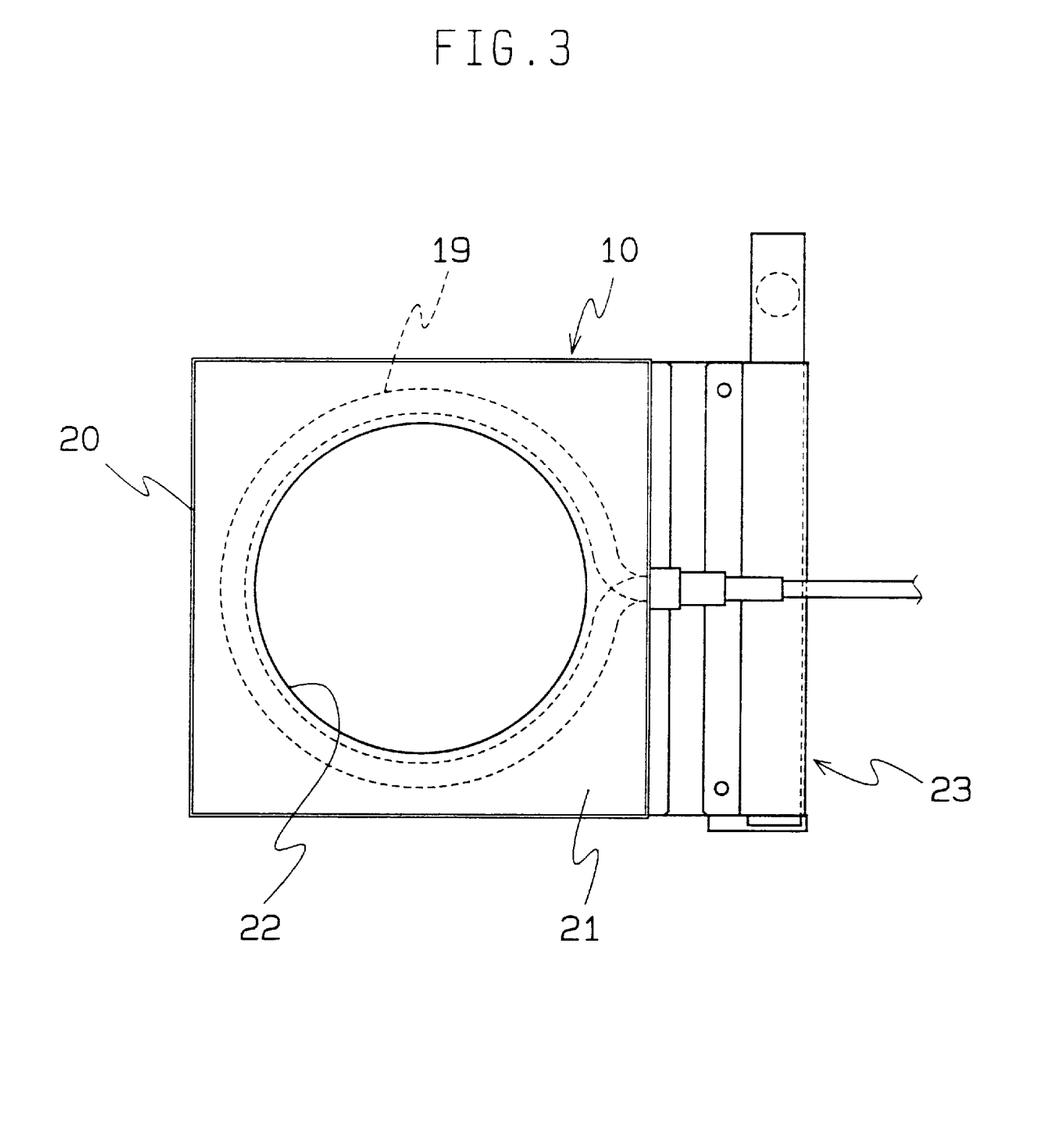
FIG. 3 is an arrow view taken along the line 3—3 of a fluorescence illuminating device of the embodiment.

As shown in FIGS. 1, 2 and 3, the CD printing face inspecting apparatus 1 is composed of an image pickup device 4 for taking pictures of the reflection light from the printing face 3 of the CD2, an illuminating device 5 for illuminating the printing face 3, and a main body frame 6 for fixing the respective devices. The image pickup device 4 is composed of one CCD camera 7 for color use, four CCD cameras 8 for black and white use, and an image processing device (not shown) for analyzing the image photographed by the respective CCD cameras. The illuminating device 5 is composed of an inspecting stand 9 for mounting thereon the CD2, a fluorescent illuminating device 10, a halogen illuminating device 11, and a half-mirror 12.

The CD2 is placed in the approximate center of the inspecting stand 9 with the printing face 3 being directed upwards and with the center of the CD being aligned with the optical axis L of the image pickup device. Above the half-mirror 12 are fixed a CCD camera 7 for color use and a CCD camera 8 for black and white use as the image pickup device 4. The CCD camera 7 for color use is fixed to the upper portion of the camera mounting frame 14 with a camera mounting metal fixture 13. The CCD camera 8 for black and white use is arranged in the lower portion of the camera mounting frame 14 so that the optical axis d of each of four cameras might arrive at a position equal outwards from the intersection point of two diagonal lines to be intersected at a right angle, with the intersecting point corresponding with the optical axis L of the color CCD camera 7. The upper portion of the camera mounting frame 14 is fixed to the image pickup device mounting frame 18 with an image adjusting metal fixture 15 after the positional adjusting operation of the image along the XY direction. A contact metal fixture 16 is attached to the lower portion of the camera mounting frame 14. The shaking of optical axis of the CCD camera is prevented through contacting of the contact metal fixture 16 with the inner periphery of the contact frame 17. The image pickup device mounting frame 18 and the contact frame 17 are fixed on the inner wall of the main body frame 6.

The inspecting stand 9 is covered with black cloth so that light from the half-mirror 12 and the ringlike fluorescent lamp 19 (hereinafter referred to as "fluorescent lamp") might not be reflected. The fluorescent illuminating device 10 is composed of a fluorescent lamp 19, a fluorescent illuminating frame 20 and a diffusion plate 21. The fluorescent illuminating device 10 is fixed to the lower portion of the main body frame 6 in parallel to the CD face between the CD2 and the half-mirror 12. Within the fluorescent device 10 is fixed a fluorescent lamp 19 aligned with the optical axis L in the center to the fluorescent illuminating frame 20 in parallel to the CD face. The diffusion plate 21 is fixed to the bottom portion of the fluorescent illuminating frame 20 in parallel to the CD face. In the diffusion plate 21, a circular hole 22 sufficient enough to pass the reflection light through onto the printing face 3 from the half-mirror 12 is drilled, with the center of the hole 22 being aligned with the optical axis L. The diffusion plate 21 diffuses the light from the fluorescent lamp 19 and radiates evenly diffused light onto the printing face.

The halogen illuminating device 11 is composed of a face illuminating device 23 and a fiber cable 25 for connecting the halogen light source 24 with the face illuminating device 23. The halogen light guided through the fiber cable 25 by the halogen light source 24 becomes plane, parallel beams by the face illuminating device 23. The plane, parallel beams are diffused by the diffusion plate 26 fixed in parallel to the front face of the face illuminating device to radiate even diffusion beams towards the half-mirror 12.

The half-mirror 12 disposed in the optical path formed between the CD and the CCD camera reflects the diffusion beams from the face illuminating device 23 towards the printing face 3. The half-mirror 12 is fixed to the main body frame 6 at an angle $\theta=45°$ with respect to the optical path. The reflection light from the printing face 3 transmitted through the half-mirror is read as images to the CCD camera 7 for color use and the CCD camera 8 for black and white use. The image processing device (not shown), provided in the rear stage of the respective CCD cameras, processes the images from the CCD cameras and judges the image defects.

The halogen light source 24 is composed of a halogen lamp 27 for generating light, a focusing lens 28 for focusing the light generated from the halogen lamp 27, a shutter plate 29, positioned between the halogen lamp 27 and the focusing lens 28, for interrupting the optical path connecting the halogen lamp 27 with the focusing lens 28, and a shutter means 30 for making the light intermittent.

Figure 4:
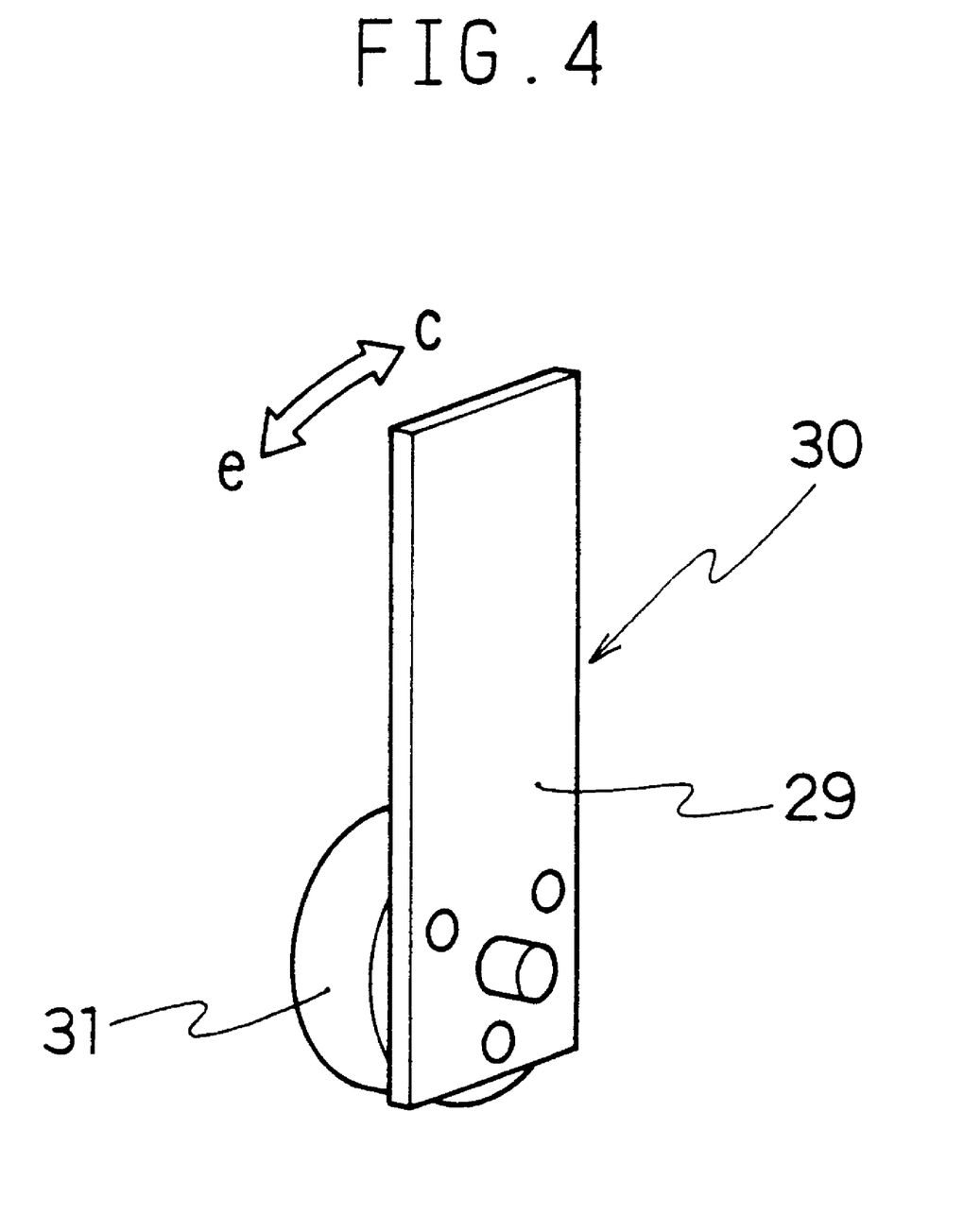
FIG. 4 is a perspective view showing essential portions of the shutter device of a halogen light source of the embodiment.
Figure 5A:
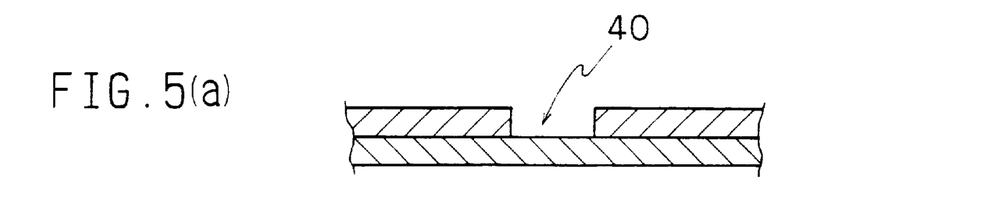
FIG. 5 are views each illustrating the type of the concentration difference defects caused on the printing face of CD.
Figure 5B:
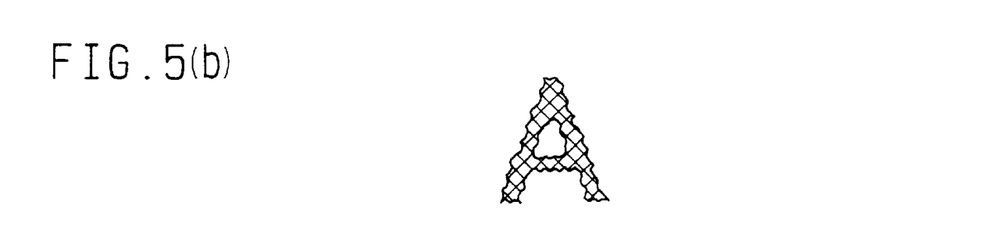
Figure 5C:
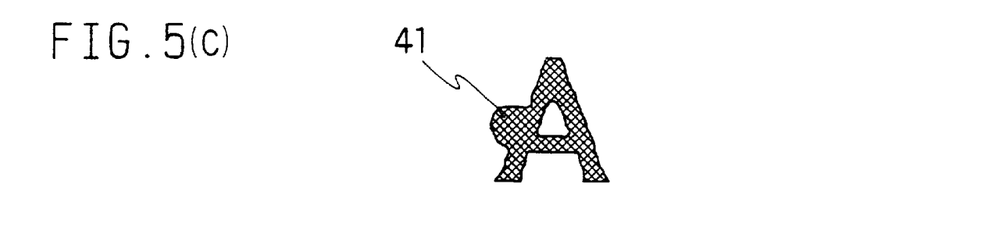
Figure 5D:
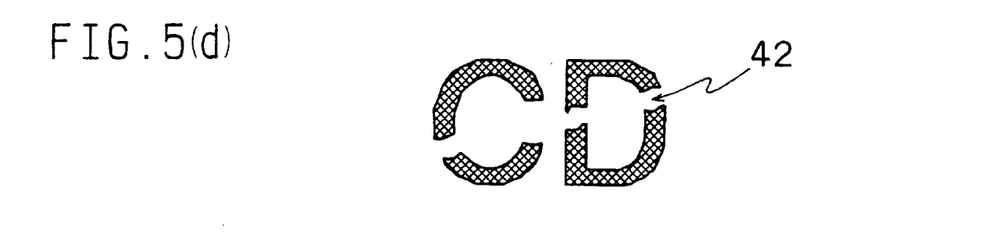
Figure 5E:
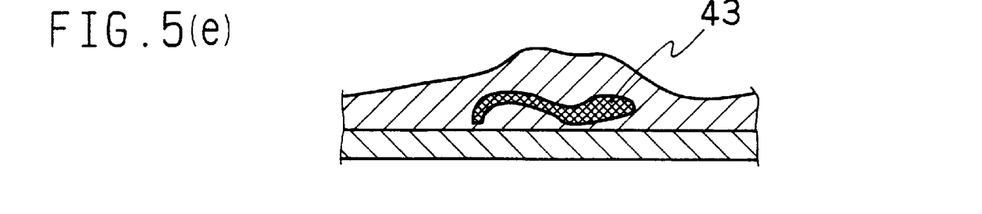
Figure 5F:
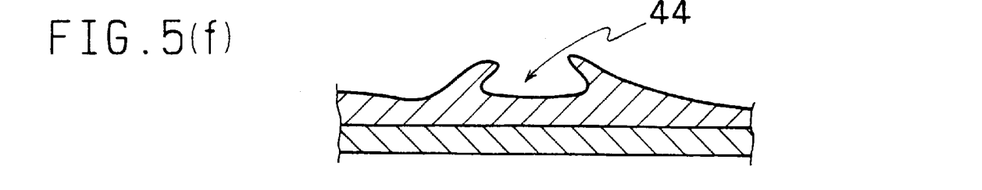

The shutter means 30, as shown in FIG. 4, is composed of a rotary solenoid 31 and an approximately rectangular shutter plate 29 fixed to the driving shaft thereof. When the rotary solenoid 31 is electrically turned on, the shutter 29 fixed to the driving shaft of the rotary solenoid 31 is rotated at a given angle (along a direction shown by an arrow e), in a circular arc track vertical to the optical path and opens the optical path connecting the halogen lamp 27 with the focusing lens 28. Thus, the halogen light source 24 emits the halogen light. When the rotary solenoid 31 is turned off, the shutter plate 29 is restored (along a direction shown by an arrow c direction) to the original position to interrupt the optical path connecting the halogen lamp 27 with the focusing lens 28, so as to suspend the halogen light.

The main body frame 6 is so arranged that the illuminating space among the CCD camera 7 for color use, the CCD camera 8 for black and white use, the half-mirror 12 and the face illuminating device 23 of the halogen illuminating device 11 is surrounded by a black side wall so that the external light might not enter the illuminating device.

Then, the types of defects caused on the printing face 3 are two in number, a defect (hereinafter referred to as a concentration difference defect") in which a micro concentration difference is detected by the black and white CCD camera 8, and a defect (hereinafter referred to "hue defect") in which color phase is judged by the color CCD camera In the concentration difference defects, there are, as shown in FIG. 5, a pin hole 40 (FIG. 5(a)) caused by dust or a blowhole mixed into ink, blur or dimness of print ink (FIG. 5(b)), a blot 41 of print ink (FIG. 5(c)), a scratch 42 (FIG. 5(d)) caused by a break of the print letter and figures, a foreign material mixture (FIG. 5(e)) where the dust 43, or the like, remains within the transparent film for protecting an aluminum reflection film, a pock mark 44 (FIG. 5(f)) caused by tearing off dust attached on the transparent protective film for protecting the aluminum reflection film, or the like. They can be detected only by the black and white CCD camera 7.

Figure 6:
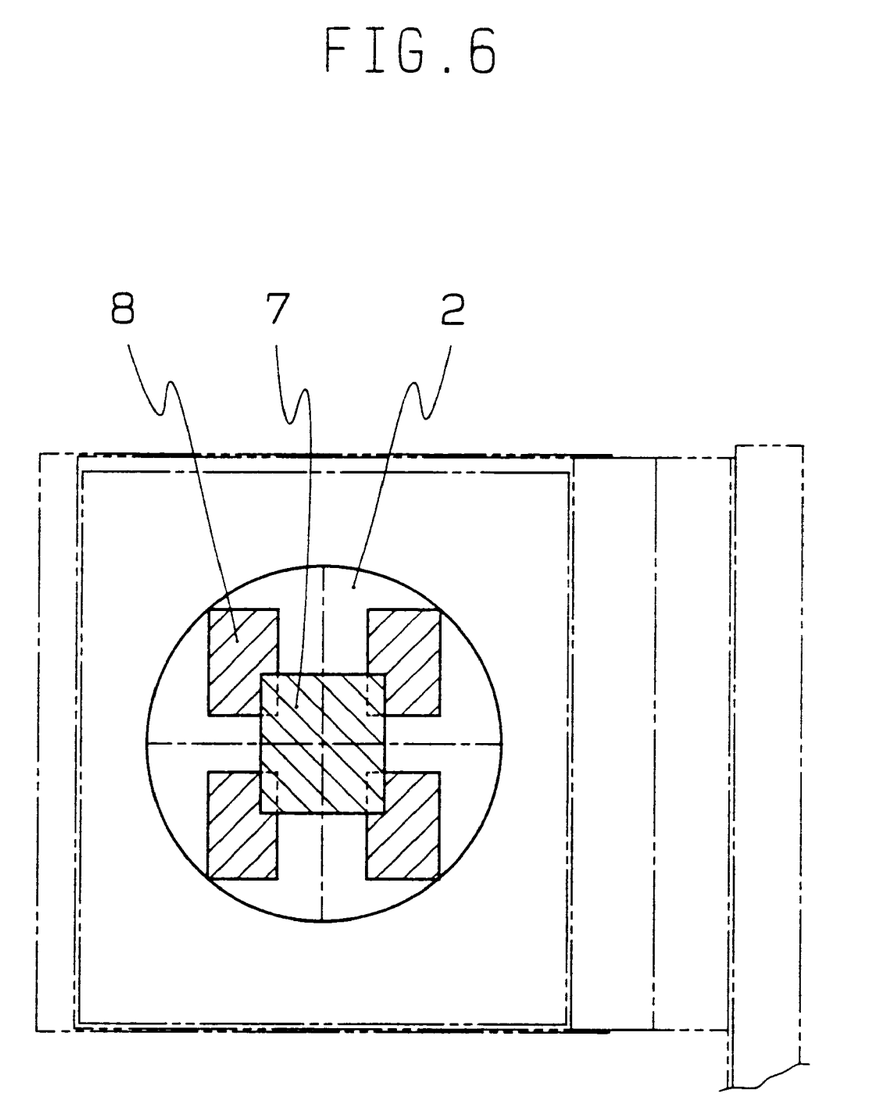
FIG. 6 is a view for illustrating the positional relationship between CD and CCD camera.

In the present embodiment, one color CCD camera 7 and four black and white CCD cameras 8 are used for the image pickup device. The hue defect can be photographed sufficiently with one color CCD camera 7, even if the resolution thereof is low. The camera is arranged in the center of the CD so that the whole can be photographed. The detection of concentration difference defects, which require high resolution, can be performed by arranging four black and white CCD cameras on the outer periphery of the color CCD camera 7, dividing the CD into four portions as shown in FIG. 6, and alotting each of four black and white CCD cameras 8 to the divided four portions of the CD.

The operation of the embodiment of such construction will be described hereinafter.

When the hue defect is detected by the color CCD camera 7, the fluorescent lamp 19 of the fluorescent illuminating device 10 is electrically turned on, and halogen light emitted from the halogen light source 24 are turned off (interrupted by the shutter plate 29) mechanically. The ringlike beams are radiated towards the diffusion plate 21 from the fluorescent lamp 19. The diffusion plate 21 diffuses the ringlike beams from the fluorescent lamp 19 and radiates diffusion beams evenly to the printing face 3 of the CD2 placed on the inspecting stand 9. The reflection light reflected from the printing face 3 passes through the half-mirror 12 and is photographed with the CCD camera 7 for color use. The hue defects are judged by an image processing device (not shown) positioned in the rear stage of the CCD camera 7 for color use.

In the detection of concentration difference defects with the black and white CCD camera 8, the halogen beams to be emitted from the halogen light source 24 are mechanically turned on (the shutter plate 29 is opened) and the fluorescent lamp 19 of the fluorescent illuminating device 10 is electrically turned off. The beams radiated from the halogen light source 24 are guided to the face illuminating device 23 by the fiber cable 25 and are converted into plane, parallel beams by the face illuminating device 23. The plane, parallel beams are diffused by the diffusion plate 26 and hence the even diffusion beams are radiated towards the half-mirror 12. The half-mirror 12 reflects the diffusion beams towards the printing face 3 of the CD2 at an angle of $\theta=45°$. The light reflected from the printing face 3 passes through the half-mirror 12. The CD face is divided into four portions for photographing by the respective four black and white CCD cameras 8. The concentration difference defects are judged by the image processing device (not shown) positioned in the rear stage of the black and white CCD camera 8.

Figure 7:
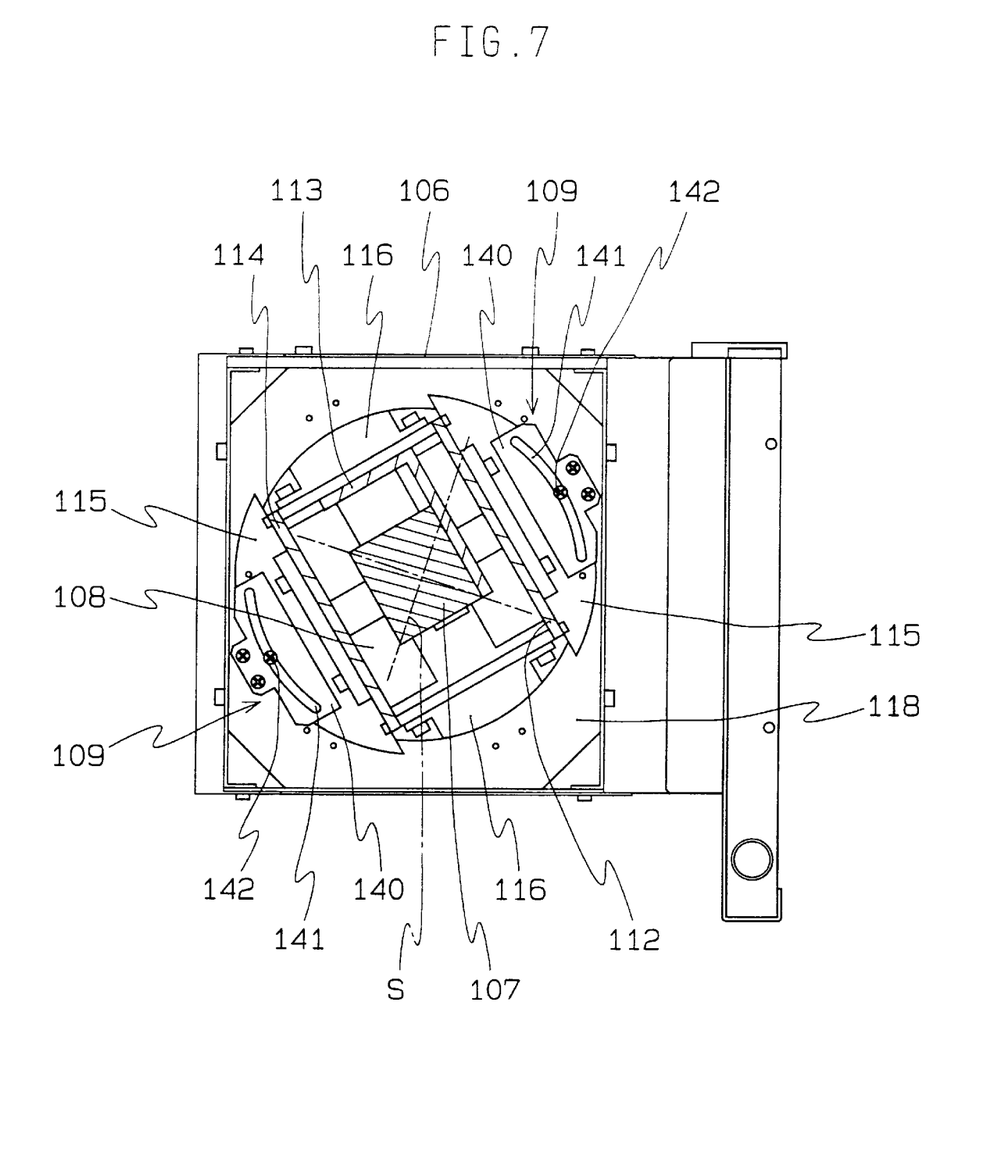
FIG. 7 is a sectional view of the image pickup device of another embodiment of the CD printing face inspecting apparatus of the present invention.

Another embodiment of the CD printing face inspecting apparatus of the present invention will be described hereinafter in accordance with FIGS. 7 to 9.

Generally, the printing face inspecting apparatus, which is often built in the printing machine, has to be mounted within the restricted space of the printing machine. The designing of the printing face inspecting apparatus is much restricted and laborious. Even in the printing face inspecting apparatus to be set up within the restricted space, the print image of the object (CD, or the like) to be inspected on the transferring line of the printing machine and the image reference of the camera has to be aligned. Otherwise, a shift between the image on the monitor of the printing face inspecting apparatus and the print image is caused, thus resulting in unsightly appearances.

Therefore, in the printing face inspecting apparatus, the direction of mounting the camera has to be changed freely based on the direction of the object to be inspected on the transferring line after the printing machine has been set up.

In the present embodiment, a fixing means for fixing a plurality of black and white cameras to a main body frame of the printing face inspecting apparatus is so designed to rotate the black and white cameras around the optical axis of the color camera to make images on the printing face of objects to be inspected or printing direction of the printing face coincide with image reference of the cameras.

The image pickup device is composed of one color CCD camera 107, four black and white CCD cameras 108 and a fixing means 109 for fixing the respective CCD cameras on the main body frame. The defects of the image photographed by the image pickup device are detected by the image processing device (not shown).

The fixing means 109 is composed of a camera fixing metal fixture 113, a camera mounting frame 114, an image adjusting metal fixture 115, a slide piece 140, an image pickup device mounting frame 118, and a fixing screw 142. The color CCD camera 107 is fixed to the upper portion of the camera mounting frame by the camera mounting metal fixture 113. The black and white CCD camera 108 are arranged in the lower portion of the camera mounting frame 114 so that the optical axis d of each of four cameras can come to a position equal externally from the intersection point of two diagonal lines s crossing at a right angle. The intersection point coincides with the optical axis L of the color CCD camera 107. The upper portion of the camera mounting frame 114 is fixed to the image adjusting metal fixture 115. The slide piece 140 is positioned on the upper face of the image adjusting metal fixture 115, and mounted on the image pickup device mounting frame 118 in such a position to be opposite to one image adjusting metal fixture 115.

In the slide piece 140 is provided a circular-arc-shaped slit groove 141 of a radius around the optical axis L of the color CCD camera 107 in a width where the screw portion of the fixing screw 142 can be extended through, and in a range where the image pickup device mounting frame 118 is rotatable at an angle of 45° around the optical axis of the color CCD camera 107. The fixing screw 142 is extended through the circular-arc-shaped slit groove 141 and is temporarily screwed to the image adjusting metal fixture 115 with a clamping force sufficient for the image adjusting metal fixture 115 to freely rotate. The fixing screw 142 is clamped after the alignment operation between the picture patterns of the printing of the printing face, or the printing direction (in the screen printing, a direction of moving the squeegee) of the printing face and the horizontal or vertical reference of the camera through the rotation of the image adjusting metal fixture 115. The contact metal fixture 116 is mounted on the lower portion of the camera mounting frame 114, and the shaking of the CCD camera optical axis is prevented by the contacting of the contact metal fixture 116 with the inner periphery of the contact frame 117. The image pickup mounting frame 118 and the contact frame 117 are fixed with the inner wall of the main body frame 106.

In the embodiment, the defect detecting process of the printing face will be described hereinafter.

The light from the illuminating device is radiated onto the printing face. The reflection light from the printing face transmitted through the half-mirror is read as images on the color CCD camera 107 and the black and white CCD camera 108. The image processing device (not shown) provided at the rear stage of the respective CCD cameras processes the images from the CCD cameras and detects the image defects.

In the embodiment, the relationship between the image g on the printing face and the camera image will be described.

The images produced on the monitor look oblique and very much unsightly unless the image g on the printing face and the reference of camera image in the horizontal or the vertical direction are aligned.

In the embodiment, the relationship between the printing direction of the printing face and the camera image will be described hereinafter.

Figure 8:
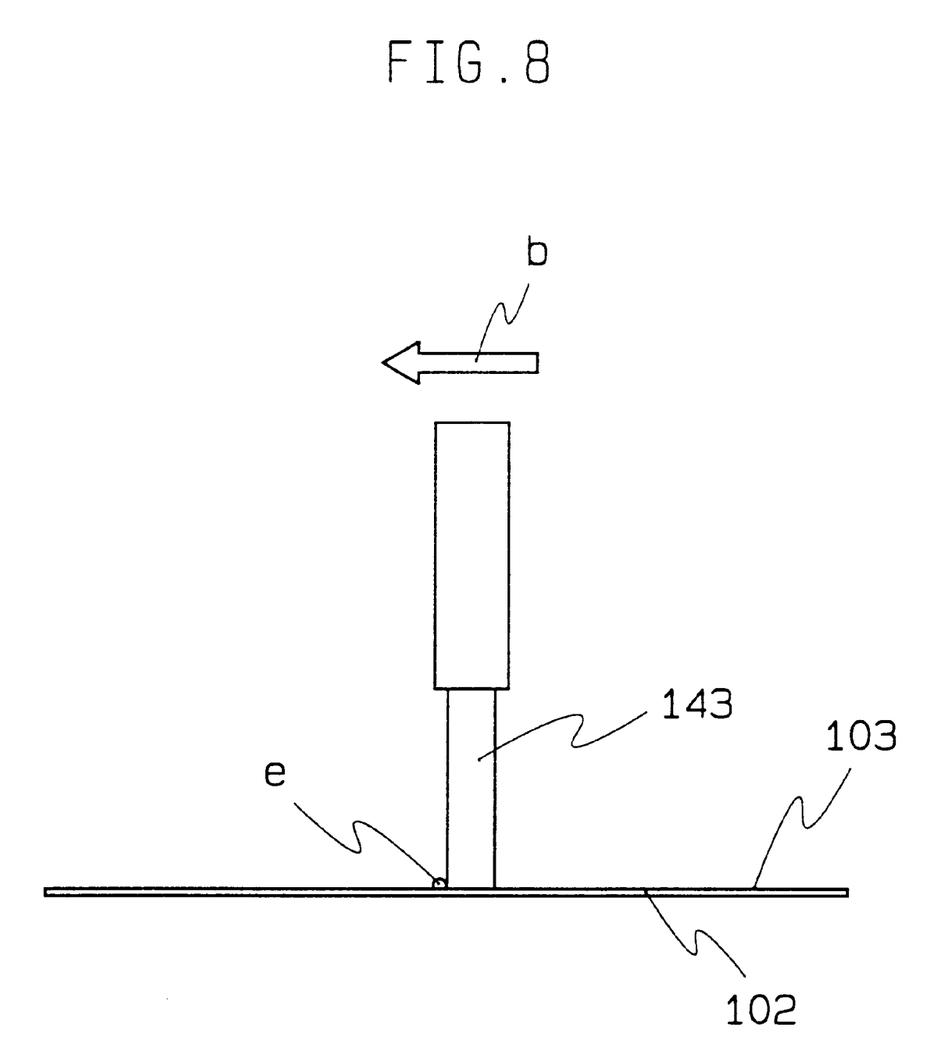
FIG. 8 is an view illustrating the positional relationship between the printing direction and the foreign material in the screen printing operation.
Figure 9:
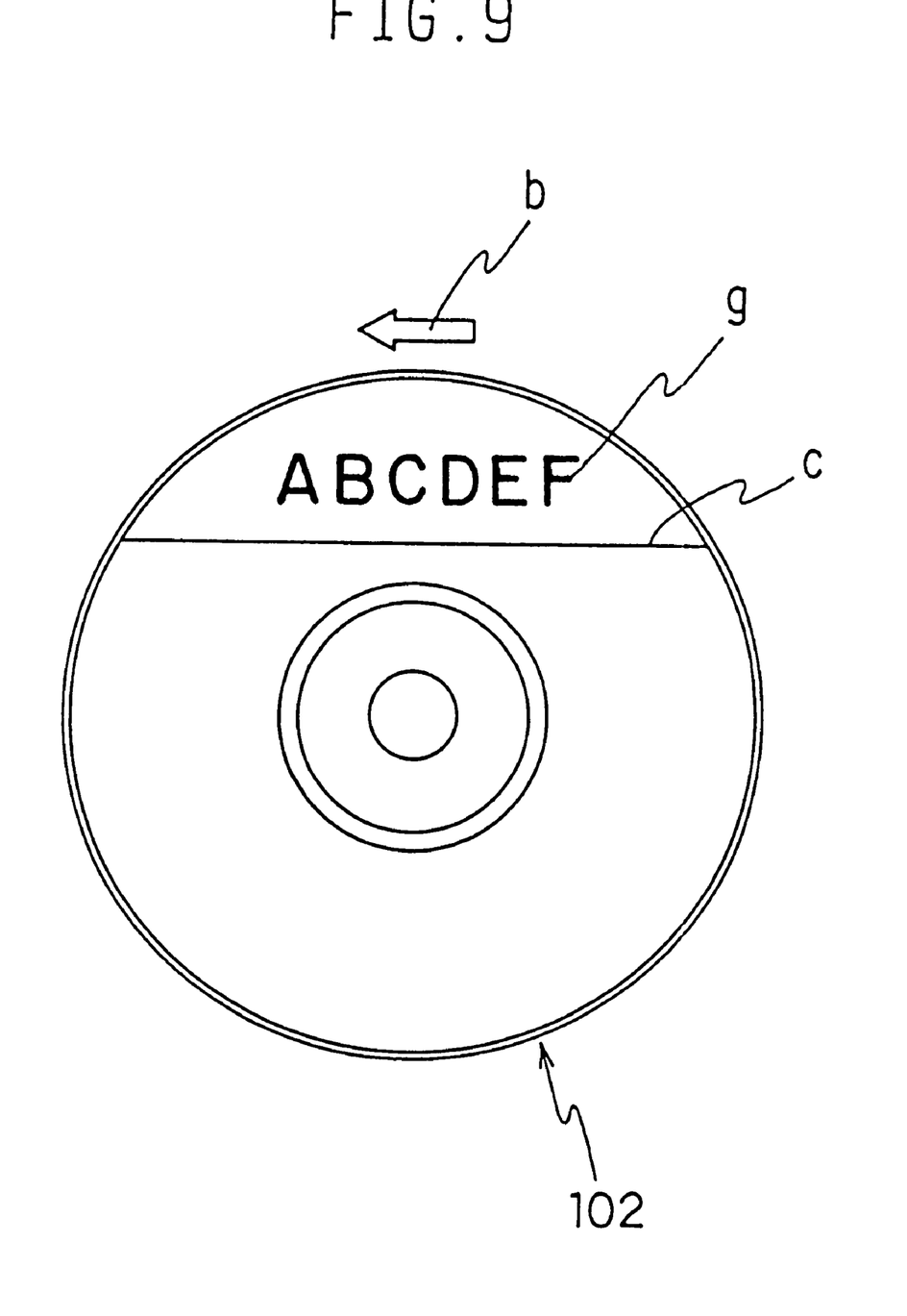
FIG. 9 is an view illustrating of linear color mottle defects to be caused on the printing face of CD.

As shown in FIGS. 8 and 9, in the screen printing operation are caused linear color spots c in the printing direction b (the direction of moving the squeegee 143). When the squeegee 143 is injured, or the squeegee 143 includes therein foreign material e mixed in the ink, the ink is raised or is thinly scraped, thus causing linear color defective spots. Accordingly, the direction along which the linear color defective spots are caused is only in a moving direction b of the squeegee 143. When the parallel or vertical reference of the camera image face is aligned with the printing direction b of the printing face 103, the linear color defective spots are easier to be judged. When the defects are judged through the image processing, the defects are judged with the concentration of the image. When the picture element is divided by the scanning of the image, differences in the regular concentration appear in the same direction in the case where the printing direction b of the printing face 103 coincides with the horizontal or vertical reference of the camera picture face, thereby defects are easily detected in the image processing portion.

In the present embodiment, the camera can be rotated as far as an angle of 45° in maximum, a coping operation can be conducted with all directions around the color CCD camera 107. Thus, the designing operation can be conducted without paying attention to the direction of the camera in installing it into the printing machine. The direction of the camera has only to be adjusted after the installation thereof. The designing operation can be conducted easily in coping with the existing printing machine.

The present invention is carried out in the above described embodiment, so as to achieve such effects as described below.

The color camera is arranged in the center and a plurality of black and white cameras are arranged on the periphery thereof, so as to provide the balanced image pickup arrangement. Both hue defects and concentration difference defects can be inspected, and all the defects on the printing face can be detected without fail. The deterioration through detection leakage of the defects can be reduced and the quality of the objects to be inspected can be improved.

Expensive color cameras are used as few as possible and a plurality of the lower-priced black and white cameras are used, thus realizing a printing face inspecting apparatus using the low-priced image pickup device.

When the printing face inspecting apparatus is set up within a the limited space, a designing operation can be effected in accordance with the surrounding restrictions without paying attention to the camera direction by provision of the rotatable fixing means, thereby providing easier built-in operation into the existing printing machine.

The monitor picture is easier to see through the alignment of the camera position with the printing image, thereby improving the operability.

The images of the camera are aligned with the printing direction so that linear color spot defects caused in the printing direction can be detected easily.

What is claimed is:

1. A printing face inspecting apparatus including an illuminating device for illuminating a printing face of an object to be inspected, and a plurality of image pickup devices for taking pictures of reflection light from the printing face, said image pickup devices comprising an array of cameras including a color camera arranged substantially centrally of said array and operative to take a full view picture of said object, and a plurality of black and white cameras arranged about an outer periphery of said array surrounding the color camera and being operative to each take a segmental view picture of said object, said color and black and white cameras having optical axes which are substantially perpendicular to said printing face.

2. The printing face inspecting apparatus of claim 1, wherein optical axes of said plurality of black and white cameras are arranged radially and outwardly at equal distances from said optical axis of the color camera, with the optical axis of the color camera being centrally disposed in said array.

3. The printing face inspecting apparatus of claim 1, wherein optical axes of said plurality of black and white cameras are arranged radially and outwardly at equal distances from said optical axis of the color camera and on equal angular spacing about the optical axis of the color camera with the optical axis of the color camera being centrally disposed in said array.

4. A printing face inspecting apparatus including an illuminating device for illuminating a printing face of an object to be inspected, and a plurality of image pickup devices for taking pictures of reflection light from the printing face, said image pickup devices comprising an array of cameras including a color camera arranged substantially centrally of said array, and a plurality of black and white cameras arranged about the outer periphery of said array surrounding the color cameras, and wherein the image pickup device further includes a fixing means for fixing the cameras to a main body, the fixing means being designed to rotate the black and white cameras around an optical axis of the color camera in accordance with a printing picture on the print face.

5. The printing face inspecting apparatus of claim 4, wherein the fixing means is designed to rotate the black and white cameras around an optical axis of the color camera in accordance with a printing direction on the printing face.

\* \* \* \* \*